(12) United States Patent
Wang

(10) Patent No.: US 11,587,532 B2
(45) Date of Patent: Feb. 21, 2023

(54) CONTENT PRESENTATION ON DISPLAY SCREENS

(71) Applicant: Amazon Technologies, Inc., Reno, NV (US)

(72) Inventor: Ze Wang, Belmont, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 17/095,436

(22) Filed: Nov. 11, 2020

(65) Prior Publication Data

US 2022/0148537 A1    May 12, 2022

(51) Int. Cl.
*G09G 5/377* (2006.01)
*G09G 3/34* (2006.01)
*G09G 5/38* (2006.01)

(52) U.S. Cl.
CPC ........... *G09G 5/377* (2013.01); *G09G 3/3453* (2013.01); *G09G 5/38* (2013.01); *G09G 2310/04* (2013.01); *G09G 2310/061* (2013.01); *G09G 2320/10* (2013.01); *G09G 2354/00* (2013.01); *G09G 2360/18* (2013.01)

(58) Field of Classification Search
CPC ......... H01L 2924/0002; H01L 2924/00; H01L 21/288; G06K 9/00765; G06F 15/0291; G09G 3/344
See application file for complete search history.

(56) References Cited

U.S. PATENT DOCUMENTS

| | | | |
|---|---|---|---|
| 9,299,320 B1 | 3/2016 | Gupta | |
| 9,990,063 B1* | 6/2018 | Beguin | G09G 3/344 |
| 2008/0309612 A1* | 12/2008 | Gormish | G09G 3/3433 |
| | | | 345/105 |
| 2008/0309674 A1* | 12/2008 | Barrus | G09G 3/344 |
| | | | 345/545 |
| 2009/0182577 A1* | 7/2009 | Squilla | G06Q 10/103 |
| | | | 705/2 |
| 2010/0194789 A1 | 8/2010 | Lin et al. | |
| 2013/0135215 A1 | 5/2013 | Bozarth et al. | |
| 2018/0286319 A1* | 10/2018 | Emelie | G09G 3/344 |

OTHER PUBLICATIONS

International Search Report and Written Opinion dated Jan. 1, 2022 issued in Application Serial No. PCT/US2021/058416.

* cited by examiner

*Primary Examiner* — Todd Buttram
(74) *Attorney, Agent, or Firm* — Hogan Lovells US LLP

(57) ABSTRACT

Content presented on a display screen is updated responsive to a user input. Content is retrieved and segmented into bands that are rendered onto the display screen incrementally to provide a visual effect similar to an animation. A band is rendered at a starting location and after a refresh interval passes a subsequent band is rendered at a second starting location. The bands may be rendered until the content is shown on the display screen.

20 Claims, 10 Drawing Sheets

CONTENT PRESENTATION ON DISPLAY SCREENS

BACKGROUND

Electronic displays are commonly used as screens or displays for a wide variety of electronic devices, including such consumer electronics such as televisions, computers (e.g., laptop computers, tablet computers), and handheld devices (e.g., e.g., cellular telephones, audio and video players, gaming systems, and so forth). Some electronic displays include a flat display panel in a relatively thin and low weight package that is suitable for use in a variety of mobile or wearable electronic devices. Electronic displays may include thousands (or millions) of picture elements known as pixels, which may be arranged into a number of rows and columns, and are used to render images onto the electronic display to be perceived by a user. One type of electronic display may include an electronic ink (E-ink) display. The E-ink display may be particularly useful in certain electronic reader (E-reader) electronic devices or certain wearable electronic devices due to its high brightness and contrast, wide viewing angle, and ultra-low power. For instance, to display a given shade (e.g., white, black, or gray) at a given pixel, the E-ink display may receive 4-bits of image data, which may correspond to 16 individual gray levels that the E-ink display may use to render images. However, because E-ink displays may include display hardware of lesser complexity (e.g., reduced numbers of pixels, passive matrices of pixels), the E-ink display may not be able to render certain features.

BRIEF DESCRIPTION OF THE DRAWINGS

Various embodiments in accordance with the present disclosure will be described with reference to the drawings, in which.

DETAILED DESCRIPTION

Figure 1:
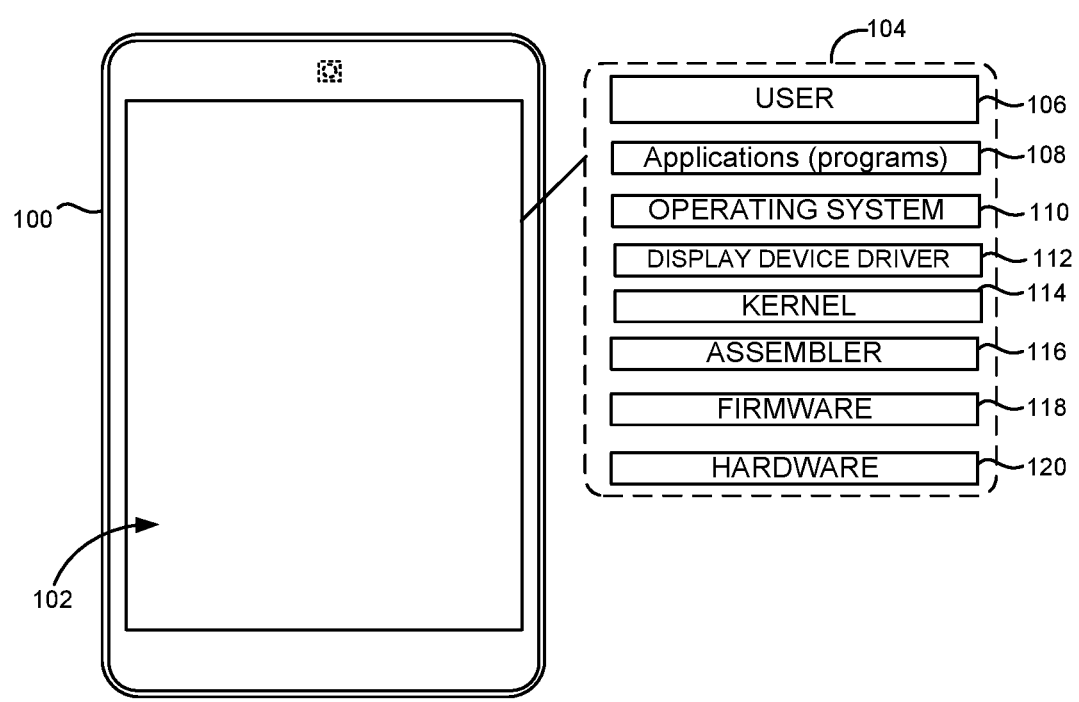
FIG. 1 illustrates an example electronic device including an electronic display and abstraction layers, in accordance with various embodiments.

Systems, devices, and methods in accordance with various embodiments of the present disclosure may overcome one or more of the aforementioned and other deficiencies experienced in rendering, for example, widgets, graphical transitions, animations, and other visual features on electrophoretic ink (E-ink) displays. Devices incorporating E-ink displays may not have components with processing capabilities for rendering animations or other visual features (e.g., content) due to the relatively low frame rates associated with E-ink displays, among other limitations. Systems and methods of the present disclosure include a band-by-band rendering and screen updating process to render second content (such as an image, graphic, text, etc.) over first content responsive to an input to update the screen. The band-by-band process may provide the illusion of an animation while still maintaining functionality with the reduced processing capabilities of devices that incorporate E-ink displays. In various embodiments, the band-by-band update provides an appealing visual effect for the user when compared to traditional updating procedures such as flashing a screen. Moreover, various embodiments may also incorporate selection of band properties and/or waveforms based at least in part on capabilities of the device.

In at least one embodiment, an electronic device may receive an input from a user to change at least a portion of the display screen. For example, the user may select a drop menu that updates at least a portion of the display screen with different content from current content being viewed by the user. Various embodiments may utilize a band-by-band updating process that, responsive to the input, may render a band corresponding to a portion of second content. Band properties such as a height, width, rendering time, delay time, and the like may be particularly selected based at least in part on the capabilities of the device. Accordingly, software systems within the device may receive instructions to render the band, wait for a predetermined period of time, render another band, and so forth until the content is updated responsive to the input. In certain embodiments, rendering times and the delay may be approximately 1 or 2 seconds As an example only, a full screen update may take between approximately 100 milliseconds (ms) and 500 ms. However, it should be appreciated that updates may be faster than 100 and/or slower than 500 ms based on various properties of the device and/or settings for the device. Moreover, as will be described below, rendering times of individual bands may be a fraction of that time. In this manner, the user may perceive an animation, such as a wipe animation, to provide a pleasing visual effect while still maintaining operation within the constraints imposed by the hardware capabilities of the device.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

With the foregoing in mind, an electronic computing device 100 is depicted in FIG. 1. In certain embodiments, the electronic computing device 100 may include, for example, a tablet computer, an e-reader, or any of various other mobile and/or personal electronic devices. As further illustrated, the electronic computing device 100 may include an electronic display 102. In certain embodiments, the electronic display 102 may be used to display content (e.g., still images, video images, text, graphics, etc.) to, for example, a user of the electronic computing device 100. In one embodiment, the display 102 may include an electronic ink (e.g., E-ink) display. In other embodiments, the electronic display 102 may include an active matrix liquid crystal display (AMLCD), an active matrix organic light emitting diode (AMOLED) display, or other electronic display that may include, for example, a 4-bit (e.g., 16 individual gray levels or G16) electronic display. Other types of displays may also be utilized with the techniques described herein, as would be understood by those of ordinary skill in the art.

In certain embodiments, the electronic computing device 100 may operate and be implemented, for example, in accordance with several abstraction layers 104. As depicted, the abstraction layers 104 may include a user layer 106, an applications layer 108, an operating system (OS) layer 110, a display device driver layer 112, a kernel layer 114, an assembler layer 116, a firmware layer 118, and a hardware layer 120. It should be appreciated that each of the layers 106-120 of the abstraction layers 104 may operate interpedently. For example, the user layer 106 may correspond to inputs received from a user of the electronic computing device 100 via one or more applications or programs (e.g., application layer 108) running on electronic computing device 100.

For example, the applications layer 108 may include, for example, various applications and programs (e.g., email, web browsers, applications program interfaces [APIs], graphical user interfaces [GUIs], and so forth) that may be running on the electronic computing device 100. The OS layer 110 may include, for example, software useful in managing the various functions (e.g., executing programs and applications, scheduling tasks to perform, interfacing with peripheral devices, interfacing with the firmware layer 118 and the hardware layer 120, and so forth).

In certain embodiments, the display device driver 112 may be provided to implement one or more graphics rendering calls and/or various other functions. For example, the display device driver 112 may control and manage the manner in which content is rendered on the electronic display 102. The kernel layer 114 may be included to, for example, provide a level of abstraction between the firmware layer 118 and the hardware layer 120 and the OS layer 110. For example, the kernel layer 114 may include certain hardware drivers (e.g., webcam drivers, mouse or touchpad drivers, display drivers, keyboard drivers, microphone drivers, speaker drivers, and so forth). Moreover, the kernel layer 114 may include an input/output control (ioctl) for system calls within the electronic display 102. As will be described below, in various embodiments a call may be provided to the ioctl in order to render content stored in a frame buffer.

Likewise, as further depicted in FIG. 1, the assembler layer 116 may interface with the kernel layer 114 and the OS layer 110, and may include one or more assemblers or compilers useful in translating, for example, high-level computing languages into computer-executable instructions. As further depicted, the firmware layer 118 may include "built-in" software that may be used to program and/or reprogram certain components of the hardware layer 120. As may by appreciated, the hardware layer 120 may include, for example, one or more processors, one or more memory and/or storage components, the electronic display 102, and/or other electronic circuitry that may be used to support the various functions and operations of the electronic computing device 100

Figure 2:
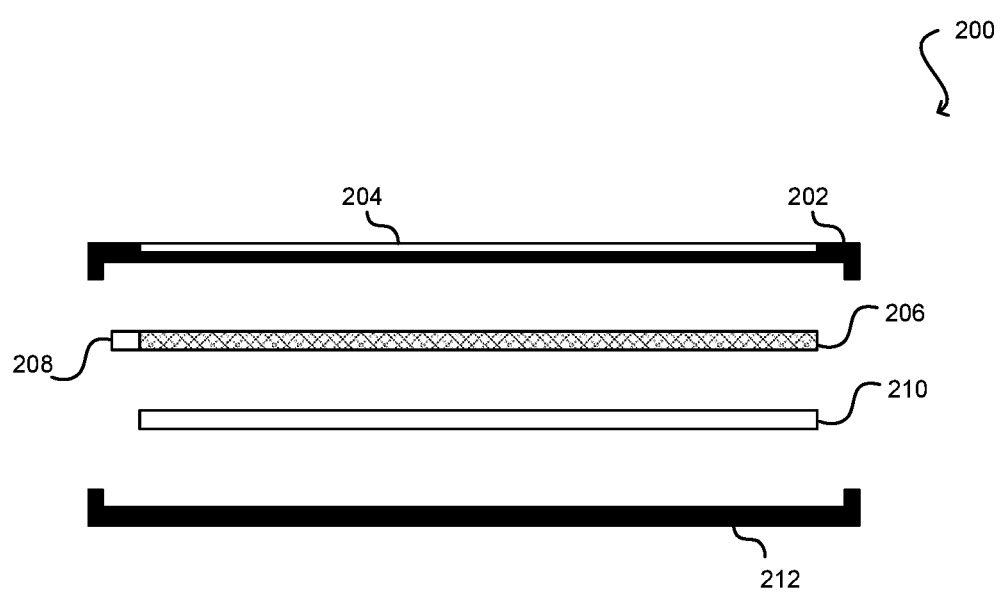
FIG. 2 illustrates an example electronic device including an electronic display and backlight, in accordance with various embodiments.

FIG. 2 illustrates a side exploded view 200 of portions of a computing device with a front-lit display, in accordance with various embodiments. It should be appreciated that various embodiments may also be utilized with computing devices that do not have a front-lit display. An example device utilizing the techniques herein may be comprised of numerous components, a subset of which is illustrated in FIG. 2. A front housing 202 and a rear housing 212 provide support and an enclosure for the internal components of the device. Additional components than those illustrated in FIG. 2 may be coupled or otherwise connected to either the front housing 202 or the rear housing 212; for example, electronic circuitry, battery components, networking components, processing components, etc.

In the example illustrated in FIG. 2, the front housing 202 has an opening 204 disposed within the housing 202, for example to provide visibility for the display screen 210. In various embodiments, the display screen 210 is an electrophoretic ink (E-ink) display screen, as discussed further herein, although the techniques described in the present specification are not limited to one particular type of display technology.

According to various embodiments, a light guide panel 206 and an illumination source 208 are provided. As will be discussed further herein, the illumination source 208 in various embodiments is coupled to the light guide panel 206 and contains one or more light emitting diodes (LEDs) of varying kinds (e.g., type, size, composition, color, color temperature value, etc.), positioned in various interleaving patterns in relation to each other and the light guide panel 206, and emitting light into one or more filter elements in various embodiments prior to the light being received by the light guide panel 206.

The light guide panel 206 may in various embodiments comprise a substrate that is operable to propagate light received from the illumination source 208 and emit the received light towards the display screen 210, thereby illuminating the display screen, for example after the light has been internally reflected and/or scattered within the light guide panel 206. The light guide panel 206 may be optically and/or mechanically coupled to the illumination source 208, such that light emitted by the illumination source 208 enters an edge of the light guide panel 206 (e.g., an "injection line"). Light from the illumination source 208 travels along the plane of the light guide panel 206, and is internally reflected and/or scattered over the various surfaces (e.g., top, bottom, sides) of the light guide panel 206, for example by bouncing off of or otherwise contacting scattering features formed within the light guide panel 206. In various embodiments, the scattering features become denser the farther away they are from the injection line, and serve to maintain an uniformity to the light that flows through the light guide panel 206 and ultimately is directed towards the display screen 210.

Figures 3A, 3B, 3C:
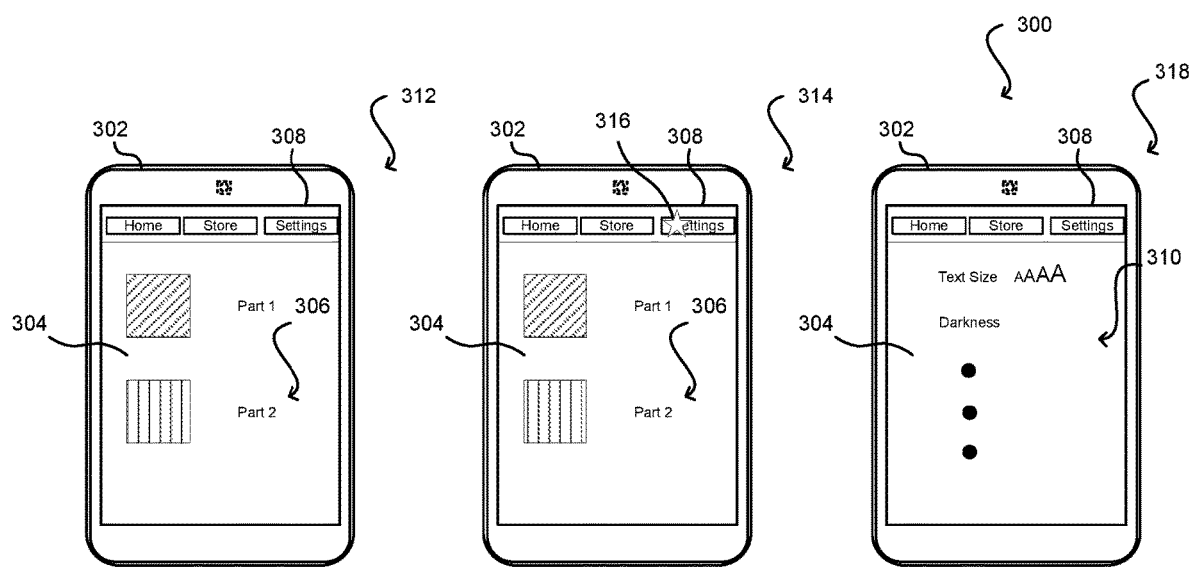
FIG. 3A illustrates an electronic display of an electronic device, in accordance with various embodiments.
FIG. 3B illustrates an electronic display of an electronic device with an interaction request, in accordance with various embodiments.
FIG. 3C illustrates an electronic display of an electronic device updated responsive to an interaction request, in accordance with various embodiments.

FIGS. 3A-3C illustrate a sequence 300 corresponding to a screen update on an electronic device 302. In this example, the electronic device 302 includes a display screen 304, which may include one or more content elements 306. It should be appreciated that these content elements 306 may be related to content being viewed by the user, such as media content (e.g., text, pictures, video, etc.) along with interface elements and the like. As an example, a user may be viewing content and then select a menu bar 308 to transition the display screen 304 to present a different set of content elements 310 corresponding to the user's selection.

FIG. 3A illustrates a first condition 312 where a user is viewing the display screen 304 having the content elements 306 positioned along the screen. In this example, the content elements 306 correspond to images and text and may be related to a listing of books or media available on the device 302. A menu bar 308 is arranged at the top of the screen 304, but it should be appreciated that the menu bar 308 may be in different positions in other embodiments, and moreover, may be hidden or collapsed until the user interacts with the screen.

FIG. 3B illustrates a second condition 314 where an interaction 316 takes place at the menu bar 308. The interaction 316 may correspond to a user interaction, such as a user selecting an icon of the menu bar 308. It should be appreciated that the interaction may be a physical interaction (e.g., touch) or a digital interaction, such as directing a cursor toward the icon. FIG. 3C illustrates a third condition 318 after the interaction 316 where the display screen 304 has updated to provide the second content elements 310, which in this case correspond to settings such as text size and darkness that the user may interact with to update or change how content appears on the display screen 304.

In various embodiments, a transition between the second condition 314 and the third condition 318 may include a flash or update to the display screen 304, which may be unappealing to the user. Furthermore, in various embodiments, ghosting or other undesirable effects may linger due to the transition. Ghosting may refer to remnants of a previous image that are still visible and overlaid on top of the new image. Often, ghosting is caused by transitioning pixels not fully achieving the proper state after a waveform update. Additionally, voltage applied to a given pixel may leak to neighboring pixels causing their state to slightly shift. In various embodiments, the hardware/software does not know that a ghost has occurred, however, the user may notice, which may disrupt the user experience. It may be more visually appealing to receive an animation or other type of transition between screens, as opposed to a flash or other transition. However, as noted above, the hardware and/or software capabilities of the device 302 may be insufficient to provide smooth animations. Embodiments of the present disclosure are directed toward systems and methods to provide an appearance of an animation while maintaining operability given limited capabilities of the device. Furthermore, in various embodiments, the animation may be particularly selected based at least in part on the device capabilities. In this manner, smoother transitions may be provided to the user to improve the user experience, reduce ghosting, and maintain operability with limited resource utilization.

Figures 4A, 4B, 4C:
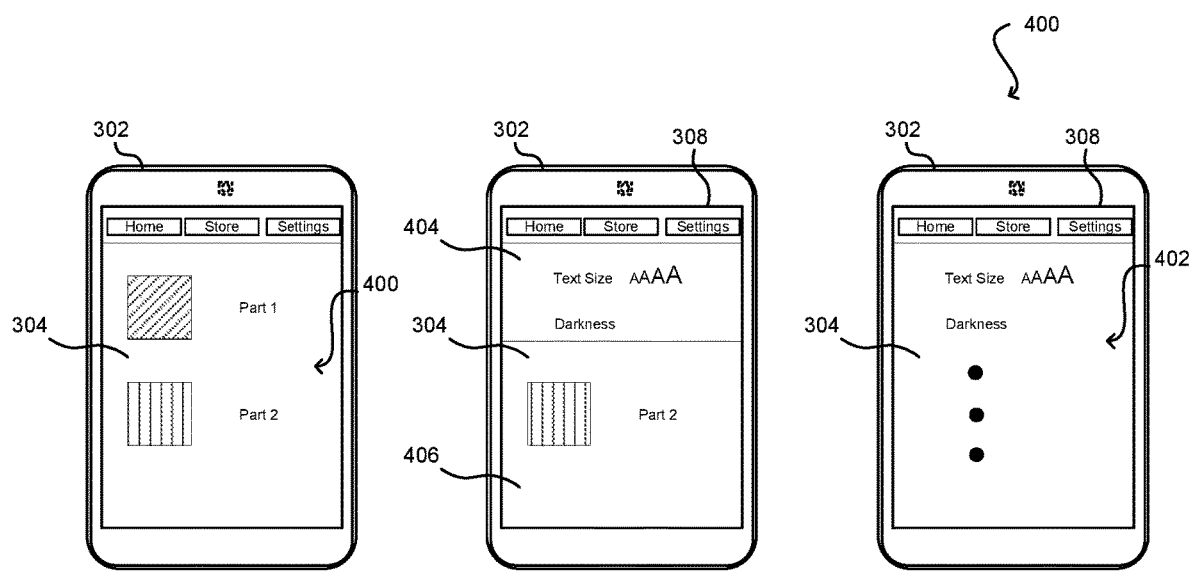
FIG. 4A illustrates an electronic display of an electronic device, in accordance with various embodiments.
FIG. 4B illustrates an electronic display of an electronic device during an update process for content on the electronic display, in accordance with various embodiments.
FIG. 4C illustrates an electronic display of an electronic device with updated content on the electronic display, in accordance with various embodiments.

FIGS. 4A-4C illustrate a transition sequence 400 in accordance with various embodiments. In this example, the transition sequence 400 begins after the user interaction 316. In various embodiments, a screen state including the content elements corresponding to the third condition 318 may be stored in a buffer, such as an image buffer, upon receipt of the interaction. Then, a call may be provided to render the screen state, from the buffer, to the display screen 304. A waveform may be utilized to change the content displayed on the display screen 304. As used herein, "waveform" may, in some embodiments, refer to a set of 2-bit values used to activate (e.g., turn "ON" or drive to substantially white) a pixel or deactivate (e.g., turn "OFF" or drive to substantially black) a pixel of an E-ink display. For example, the "waveform" may drive pixels of an E-ink display to white, gray or black, and may be used as part of frame updates to the E-ink display. For example, when a waveform is generated and supplied, a partial frame update may be specified in which only certain lines or groups of pixels are updated (e.g., refreshed) or a full frame update mode in which an entire page or canvas of pixels are updated. It should be appreciated that the waveforms may define the sequence for transitions from any currently displayed gray state to a new target gray state. Moreover, different waveforms provide tradeoffs between speed, quality (reduced ghosting), and visual effect of the pixel transition. The use case will determine which waveform is best suited given those tradeoffs.

Various embodiments of the present disclosure may be utilized to provide a band-by-band update to the display screen 304 in order to render second content from the buffer. The band-by-band update may include updating at least a portion of the display screen 304 to display at least a portion of the second content while the rest of the display screen 304 displays at least a portion of the first content. In other words, the second content may be incrementally presented on the display screen 304 in accordance with one or more adjustable parameters.

FIG. 4A illustrates the display screen 304 after the initial interaction 316, where the display screen 304 presents first content 400, which may in various embodiments be an image that includes multiple content elements and/or multiple single content elements all rendered on the display screen. As noted above, responsive to the interaction, second content 402 corresponding to an updated screen may be stored in the buffer and then rendered onto the display screen 304. In this example, a band-by-band update is performed where a portion 404 of the second content 402 is illustrated in FIG. 4B while a remainder 406 of the first content 402 is still present on the display screen 304. It should be appreciated that such delineation is for illustrative purposes only and that, in various embodiments, the portion 404 and remainder 406 may have different sizes. Furthermore, rendering from the top down is also for example purposes and in other embodiments the rendering may be from the bottom up, left to right, right to left, or any combination thereof.

FIG. 4C illustrates the completion of the rendering of the second content 402, where the display screen 304 is now updated and no longer includes the first content 400. It should be appreciated that an entire screen update is illustrative and that the update may be restricted to various different regions of the display screen 304. In certain embodiments, the band-by-band update may be provided as a series of steps over a period of time to provide a visual appearance to a user corresponding to an animation or otherwise a smooth transition. That is, rather than flashing the screen to provide the update, the band-by-band update may incrementally change the appearance of the screen to illustrate a "wipe" or otherwise transitional effect that may provide the illusion of an animation. For example, the speed of the rendering may be sufficient such that the human eye cannot visualize the individual bands, but rather, a wipe animation as the entirety of the bands come into view on the screen.

Figure 5:
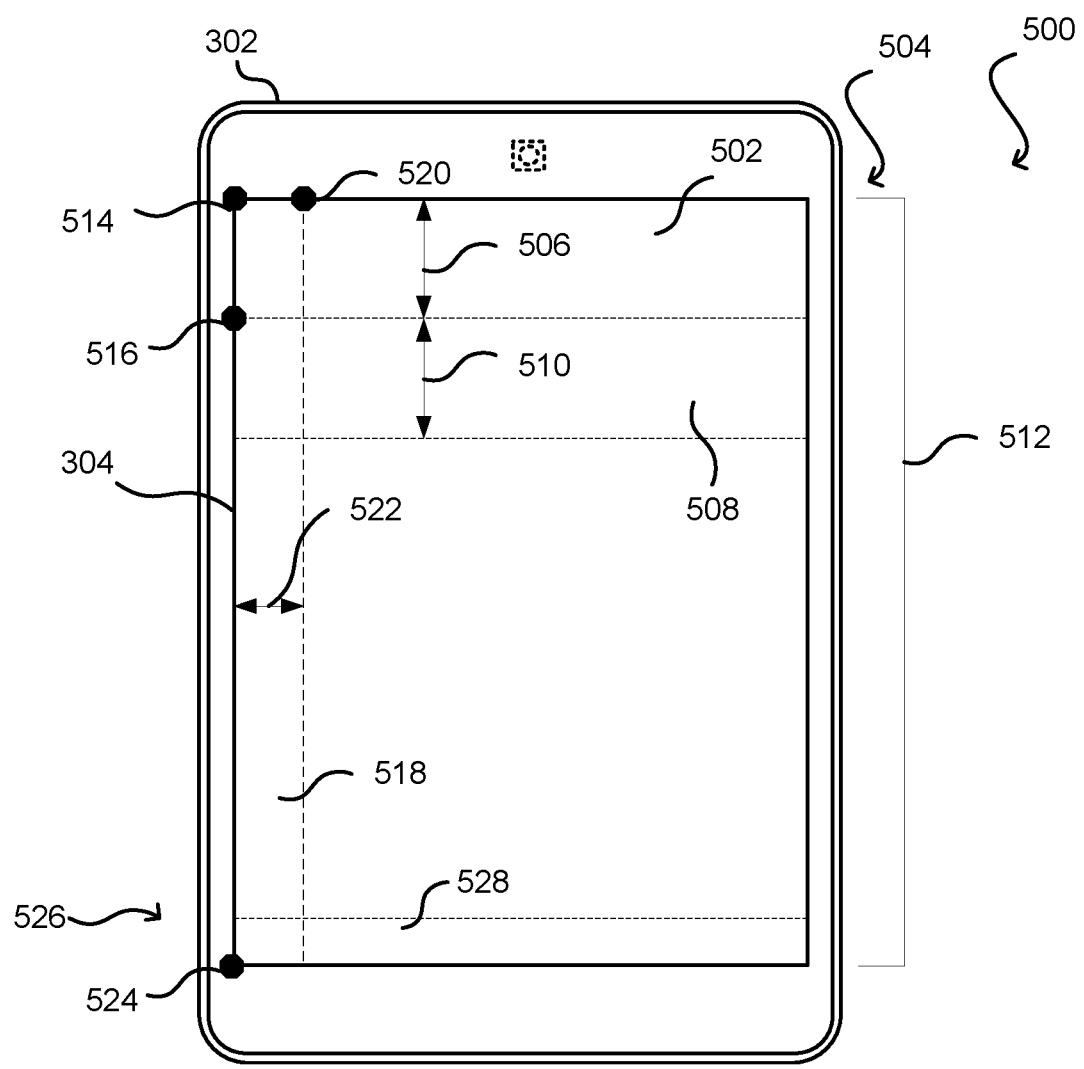
FIG. 5 illustrates an electronic display of an electronic device with example bands for updating content on the electronic display, in accordance with various embodiments.

FIG. 5 illustrates a representation 500 of a band-by-band screen updating process that may be incorporated with embodiments of the present disclosure. The example is presented on the display screen 304 of the device 302, but it should be appreciated that embodiments may also be utilized on other devices have different types of screens. As noted herein, a band-by-band process may include rendering different portions of second content in place of first content such that portions of each areas of content may be present on the display screen 304 for at least a period of time. A first band 502 is illustrated rendering near a top portion 504 of the display screen 304, but it should be appreciated that the bands may start or stop at any location along the display screen 304. In this example, the first band 502 has a first band height 506, which corresponds to a vertical distance of the display screen 304. As noted above, the first band height 506 may be particularly selected based on one or more factors of the device hardware, waveforms, the content, and the like. In operation, an instruction may be received to render the first band 502, which may be transmitted from the iotcl, and then the rendering may appear on the display screen 304. After a period of time, an instruction may be received to render a second band 508, which includes a second band height 510, and so forth. In this manner, the display screen 304 may be updated as additional bands are added at predetermined locations. It should be appreciated that the respective band heights 506, 510 may be particularly selected and may differ from one another or be the same. In this manner, different effects may be included with the update.

In various embodiments, an update region 512 is determined with respect to applying the second content to the screen. In this example, the update region 512 corresponds to the entire display screen 304, but it should be appreciated that only certain regions of the display screen 304 may be updated using the band-by-band approach. The update region 512 may be determined along with a starting point 514, which is represented as a top corner of the display. After the first band 502 is rendered, information regarding a second starting point 516 may be determined, for example by adding the first band height 506 to the starting point 514. This process may be continued until the update region 512 is filled in with different bands.

It should be appreciated that the bands may also be vertical, such as the third band 518. The third band 518 may also being at the starting point 514. A third starting point 520 may be determined by adding a band width 522 to the starting point 514, as noted above. Moreover, as previously indicated, rendering of the bands may start and end at different locations. As an example, a fourth starting point 524 at a bottom 526 of the screen may be used for a fourth band 528. Accordingly, various different affects may be simulated by utilizing bands with different sizes, different delay times, and a different rendering order.

In one or more embodiments, a delay or interval may be utilized between drawing different bands. For example, in various embodiments the bands may be drawn individually such that there is no overlap between a drawing period (e.g., a period of time between a start time and a stop time) for a first band and a start time for a second band. However, in other embodiments, one or more drawing periods may at least partially overlap. The delay or interval may be particularly selected based on the device properties, waveform selected, and the like.

It should be appreciated that a set of rules may be provided for determining the bands, which may include determining a number of bands, determining sizes of the bands, or the like. The rules may be based, at least in part, on properties of the electronic device and/or on properties of the content being rendered. By way of example only, content with many different features (e.g., multiple pictures, graphics, text, etc.) may be rendering using a different number of bands than content with fewer features (e.g., only text). Furthermore, it should be appreciated that rules for determining the bands may be updated, for example using a software or firmware update associated with the electronic device. In various embodiments, each of the plurality of bands may be determined prior to the rendering. However, it should be appreciated that individual bands may be determined or calculated as or after previous bands are rendered.

Figure 6:
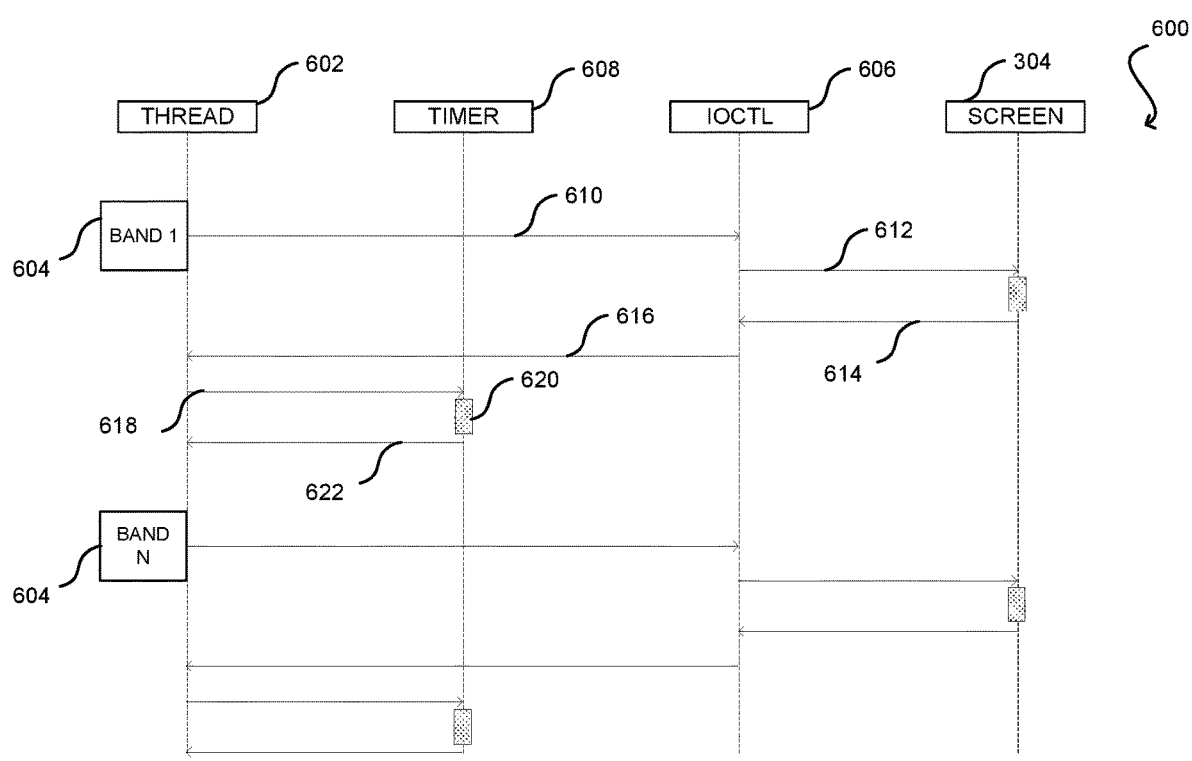
FIG. 6 illustrates an example process flow for updating an electronic display, in accordance with various embodiments.

FIG. 6 illustrates an example process flow 600 for rendering different bands to replace at least a portion of first content on a display screen with second content. As described herein, the second content information may be placed or stored within a frame buffer and, upon receiving instructions, may be split into different bands for rendering onto the display screen. In various embodiments, bands are rendered sequentially such that a visual appearance of a wipe of information is provided to the user, but it should be appreciated that other effects may also be provided using embodiments of the present disclosure. The process flow begins with receiving a thread 602 that includes one or more bands 604 for rendering on the display screen 304. In this example, instructions may be provided to an ioctl 606 and a timer 608 may be incorporated to provide a delay between rendering different bands. In embodiments, the timer 608 may prevent overlapping rendering periods, which may conserve resource usage such that the reduced capabilities of devices such as E-readers may incorporate embodiments of the present disclosure.

In this example, a first band 604 labeled as "BAND 1" is formed as part of the thread 602 for updating at least a portion of the screen 304. The first band 604 may be transmitted and/or retrieved 610 by the ioctl 606, for example responsive to a command from a user to update the screen 304. The ioctl 606 may then transmit an instruction 612 to the screen 304 to render the first band 604, and provide a confirmation 614 after the rendering is complete. In various embodiments, the ioctl 606 may then transmit a signal 616 indicating that the thread may be unblocked. As noted above, in various embodiments single bands may be retrieved and rendered, and as a result, subsequent bands within the thread 602 may be blocked. Upon receipt of the unblock signal, a timer may begin 618 corresponding to a refresh interval. As an example, the refresh interval may be approximately 15 ms, but the interval may be longer or shorter. After the interval has passed 620, an unblock signal may be transmitted 622, which enables subsequent bands to be rendered. This process may then be repeated until each band is rendered on the display screen. As noted herein, the size of the bands, along with the refresh period, may be particularly selected based on various properties of the device, among other considerations. Accordingly, a wipe animation or other visual feature may be generated as the screen transitions from first content to second content.

Figure 7:
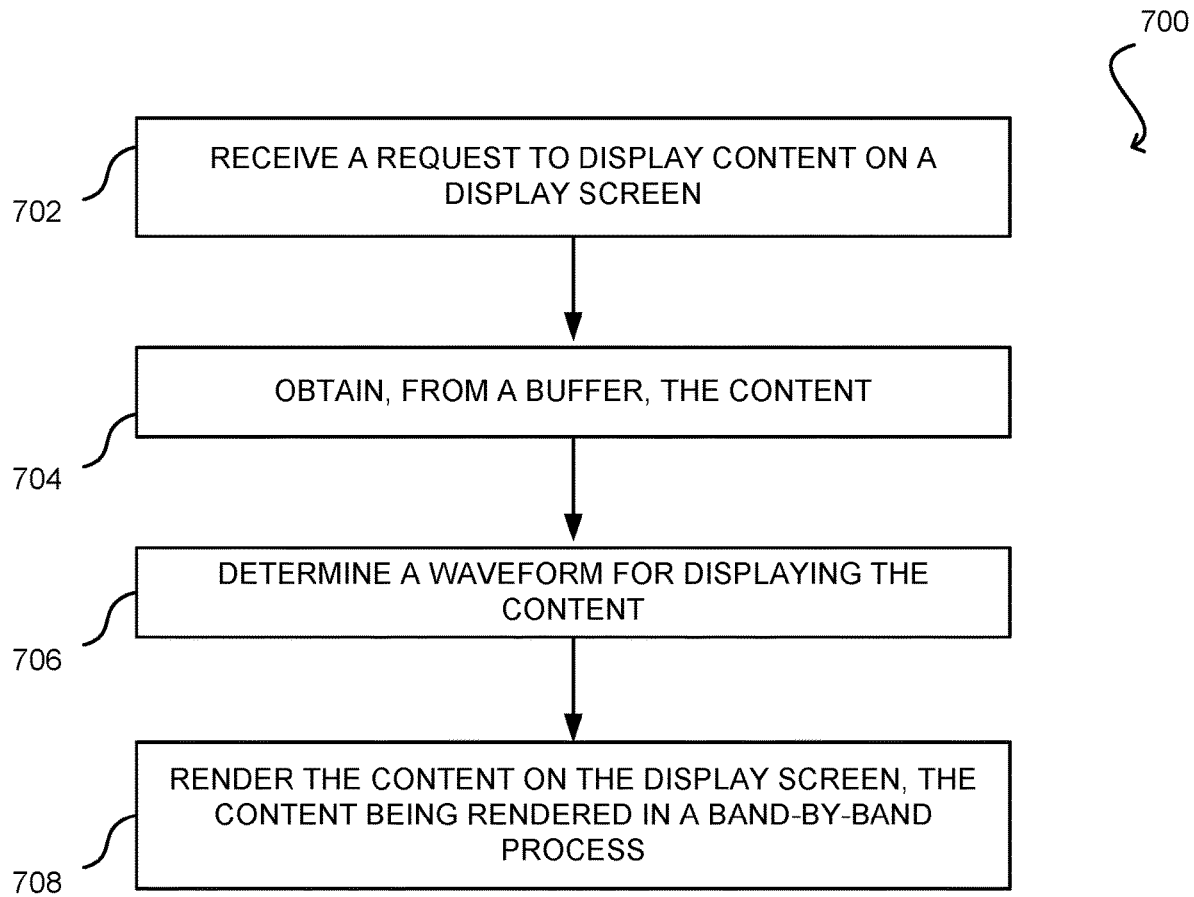
FIG. 7 illustrates an example process for updating an electronic display, in accordance with various embodiments.

FIG. 7 is a flow chart of an example process 700 for rending content on a display screen using a band-by-band update. It should be understood that, for any process discussed herein, there can be additional, fewer, or alternative steps, performed in similar or different orders, or in parallel, within the scope of the various embodiments unless otherwise stated. In the example, a request to display content on a display screen is received 702. The request may include an input received from a user of an electronic device to render different content than currently provided on the screen, such as by going to a different screen or menu. In various embodiments, the content is obtained from a buffer 704. For example, an image buffer may store the content prior to rendering. The example also includes determining a waveform for displaying the content 706. The waveform may refer to a process for presenting the content on the screen and may be particularly selected based on one or more properties of the electronic device and/or based on instructions provided to the device. It should be appreciated that, in various embodiments, the waveform may also be determined based at least in part on the content. In various embodiments, different waveforms may be selected based on the device capabilities, an operational mode (e.g., dark mode), or the like. The content is rendered on the display screen 708. In at least one embodiment, a band-by-band update process is utilized where portions of the content are rendered, sometimes sequentially, on the display screen. A first band may be rendered, and after a delay, a second band may be rendered until a designated portion of the screen is filled. In this manner, the user may experience a pleasing visual effect related to a wipe or swipe, rather than a flash as the screen is updated with the new content.

Figure 8:
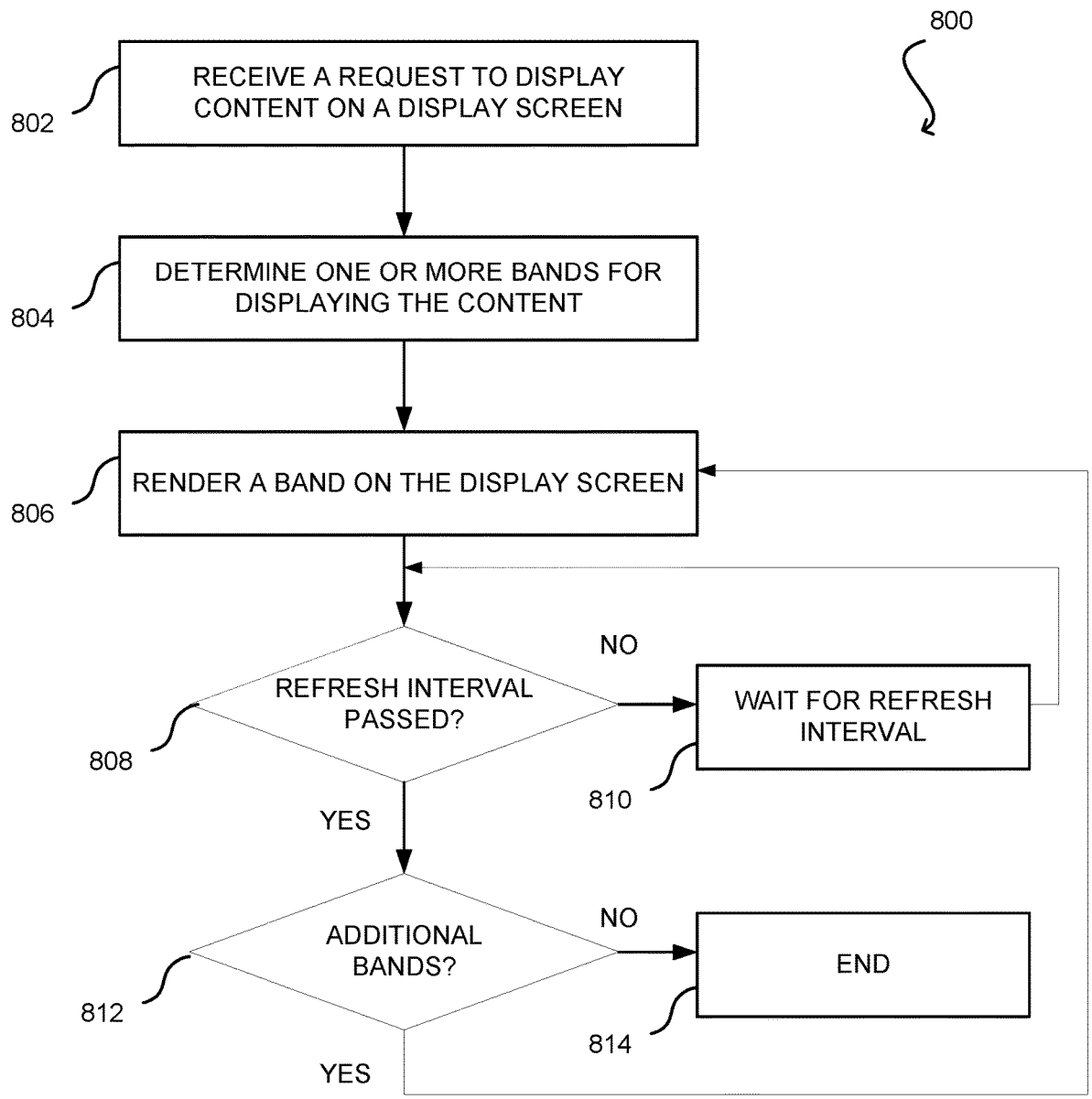
FIG. 8 illustrates an example process for updating an electronic display, in accordance with various embodiments.

FIG. 8 is a flow chart of an example process 800 for updating a display. In the example, a request is received to display content on a display screen 802. As an example, the request may be transmitted to a controller, such as the ioctl, responsive to an input from a user. One or more bands for displaying the content are determined 804. In various embodiments, the content may be split or otherwise segmented into bands that may be individually rendered separate from the other bands. In certain embodiments, a band height or width may be particularly selected based on one or more properties of the electronic device. It should be appreciated that a set of rules may be provided for determining the bands, which may include determining a number of bands, determining sizes of the bands, or the like. The rules may be based, at least in part, on properties of the electronic device and/or on properties of the content being rendered. By way of example only, content with many different features (e.g., multiple pictures, graphics, text, etc.) may be rendering using a different number of bands than content with fewer features (e.g., only text). Furthermore, it should be appreciated that rules for determining the bands may be updated, for example using a software or firmware update associated with the electronic device. In various embodiments, each of the plurality of bands may be determined prior to the rendering. However, it should be appreciated that individual bands may be determined or calculated as or after previous bands are rendered.

A band is rendered on the display screen 806. For example, the ioctl may be utilized to render the band at a particular location on the display screen. In at least one embodiment, it is determined whether a refresh interval has passed 808. If not, the system waits for the interval to pass 810. The refresh interval may correspond to the properties for the bands and/or to a waveform for updating the display screen. If the interval has passed, then it is determined whether additional bands are available for the content 812. If not, the process ends 814. If there are additional bands, these bands are then rendered until all bands have been rendered and the content is displayed on the display screen.

Figure 9:
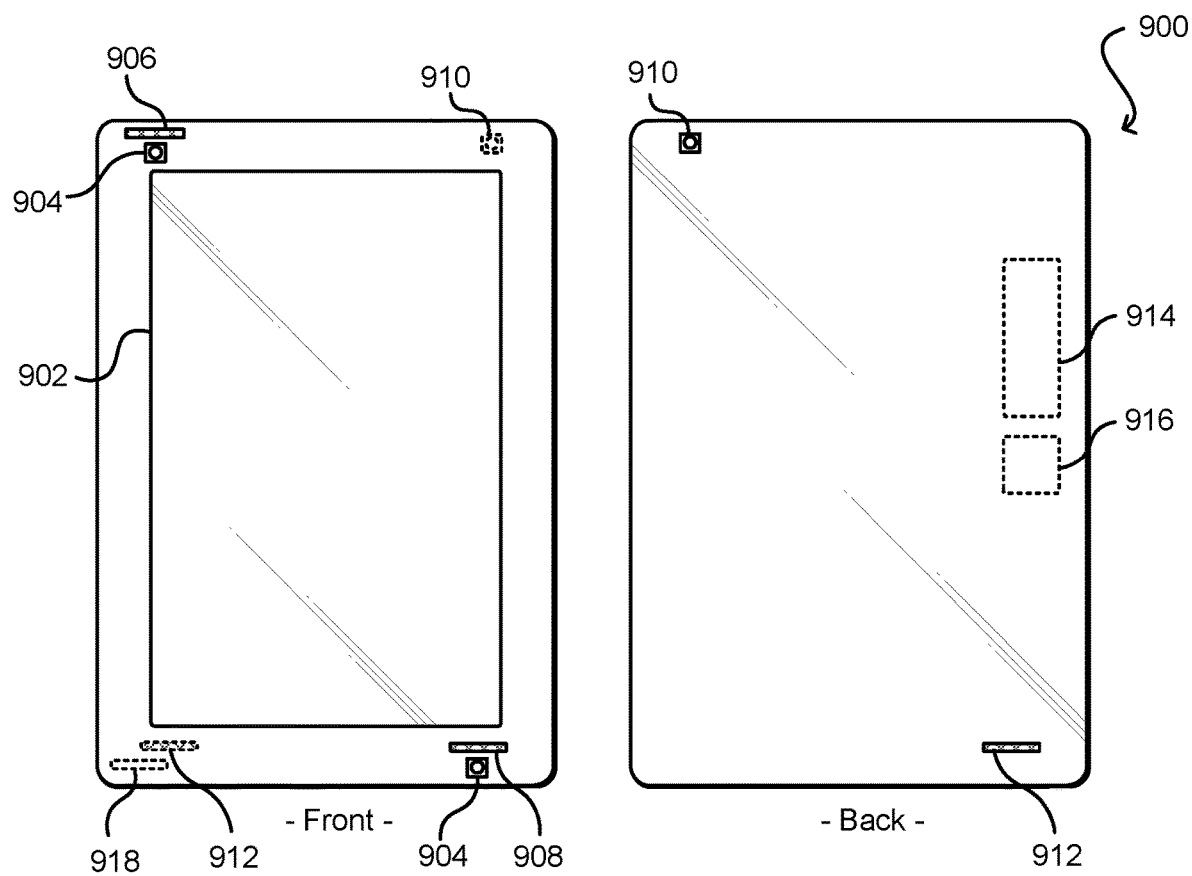
FIG. 9 illustrates front and back views of an example portable computing device that can be used in accordance with various embodiments.

FIG. 9 illustrates front and back views of an example electronic computing device 900 that can be used in accordance with various embodiments, for example, a mobile device configured for adjustable color temperature illumination using the techniques described herein. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
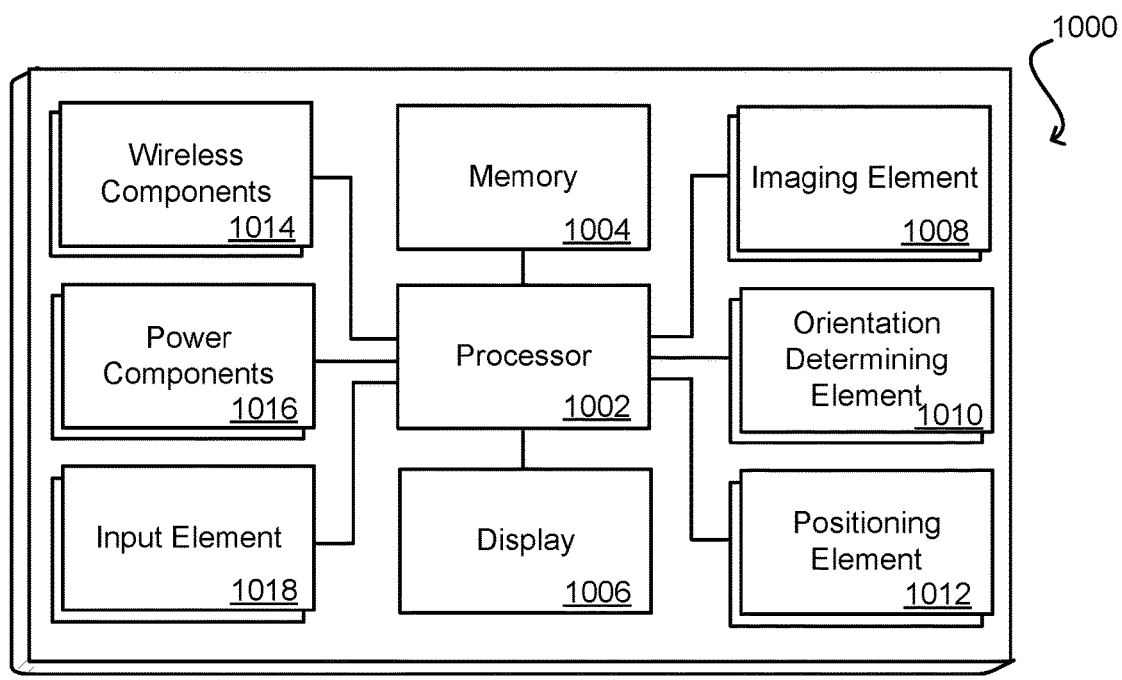
FIG. 10 illustrates an example set of basic components of a portable computing device, such as the device described with respect to FIG. 9.

FIG. 10 illustrates a set of basic components of an electronic computing device 1000 such as the device 900 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element (s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 11:
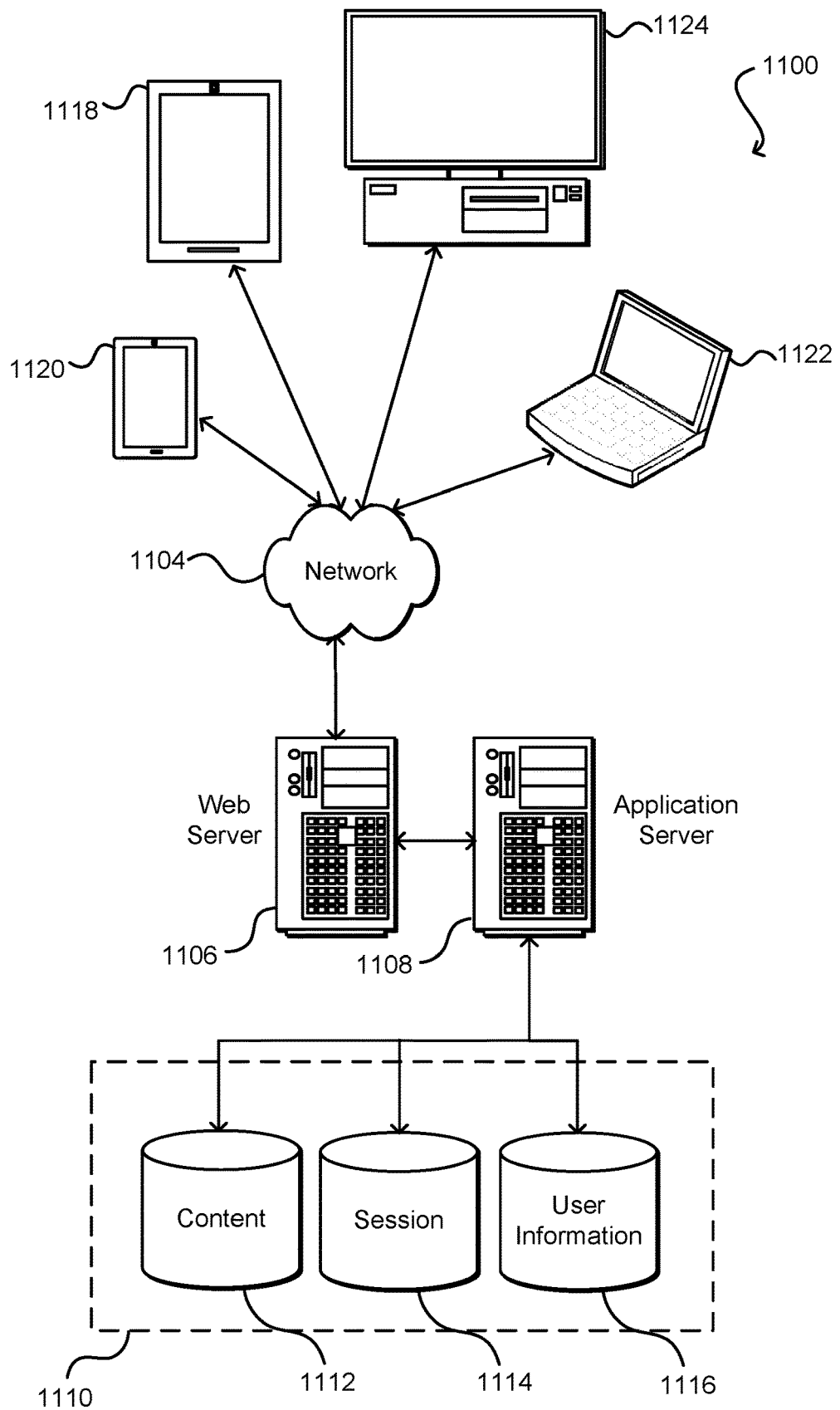
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes electronic client devices 1118, 1120, 1122, and 1124, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client devices 1118, 1120, 1122, and 1124 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1118, 1120, 1122 and 1124. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   retrieving content from a buffer;
   determining one or more properties for a plurality of bands associated with the content, the content being segmented into the plurality of bands, the one or more properties based, at least in part, on properties of an electronic device having the buffer and properties of the content, the content including a first content portion associated with a first feature and a second content portion associated with a second feature, the first content portion being identified as a complex portion to be rendered with a greater number of bands of the plurality of bands than the second content portion;
   causing a first band, of the plurality of bands, to be rendered on a display screen, the first band of the plurality of bands replacing at least a first portion of previous content on the display screen;
   determining a refresh interval has passed; and
   causing a second band, of the plurality of bands, to be rendered on the display screen, the second band of the plurality of plurality of bands replacing at least a second portion of the previous content on the display screen, the second portion being different from the first portion.

2. The computer-implemented method of claim 1, further comprising:
   determining a second refresh interval has passed; and
   determining additional bands of the plurality of bands are available.

3. The computer-implemented method of claim 1, further comprising:
   determining a second refresh interval has not passed;
   waiting the second refresh interval; and
   causing a third band, of the plurality of bands, to be rendered on the display screen, the third band of the plurality of plurality of bands replacing at least a third portion of the pervious content on the display screen, the third portion being different from the first portion and the second portion.

4. The computer-implemented method of claim 3, further comprising:
   determining, based at least in part on one or more capabilities of the electronic device, a waveform for rending the plurality of bands.

5. The computer-implemented method of claim 1, further comprising:
   receiving, from a user, an input; and
   determining the input corresponds to a screen update procedure.

6. A computer-implemented method, comprising:
   determining a plurality of bands to be rendered to form content on a display screen, the content having a plurality of features, wherein a first feature type is rendered using more bands than a second feature type;

causing a first band of the plurality of bands to be rendered from a first starting location on the display screen, the plurality of bands forming the content for display on the display screen, one or more properties of the plurality of bands being based, at least in part, on one or more properties of an electronic device having the display screen and properties of the content;

determining completion of rendering of the first band; and causing, subsequent to the completion of rendering of the first band and while at least a portion of the first band remains displayed on the display screen, a second band of the plurality of bands to be rendered from a second starting location on the display screen.

7. The computer-implemented method of claim 6, further comprising:

identifying, within a buffer, the content; and determining, based at least in part on an update area of the display screen, the plurality of bands.

8. The computer-implemented method of claim 6, wherein the first band and the second band are rendered using a waveform selected, at least in part, on the one or more properties of the electronic device.

9. The computer-implemented method of claim 8, further comprising:

determining the first starting location for the first band; and determining the second starting location for the second band, based at least in part on one or more properties of the first band.

10. The computer-implemented method of claim 6, further comprising:

determining, after the rendering of the first band, a refresh interval has passed before the rendering of the second band.

11. The computer-implemented method of claim 6, further comprising:

determining, after the rendering of the second band, additional bands of the plurality of bands associated with the content are available; and causing, subsequent to the completion of rendering of the second band and while at least a portion of the second band remains displayed on the display screen, a third band of the plurality of bands to be rendered from a third starting location on the display screen.

12. The computer-implemented method of claim 6, further comprising:

receiving an input instruction; and determining, based at least in part on the input instruction, an update area of the display screen, the update area corresponding to a location for the content.

13. The computer-implemented method of claim 12, wherein the update area is less than a total screen area.

14. The computer-implemented method of claim 6, wherein the first band and the second band are at least one of a vertical band or a horizontal band.

15. A system, comprising:

at least one processor;

a display screen; and memory including instructions that, when executed by the at least one processor, cause the system to:

determine a plurality of bands to be rendered to form content on a display screen, the content having a plurality of features, wherein a first feature type is rendered using more bands than a second feature type;

cause a first band of the plurality of bands to be rendered from a starting location on the display screen, the plurality of bands forming the content for display on the display screen, one or more properties of the plurality of bands being based, at least in part, on one or more properties of an electronic device having the display screen and properties of the content;

determine rendering of the first band is complete; and cause, subsequent to the completion of rendering of the first band and while at least a portion of the first band remains displayed on the display screen, a second band of the plurality of bands to be rendered from a second starting location on the display screen.

16. The system of claim 15, wherein the first band and the second band are rendered using a waveform selected, at least in part, on the one or more properties of the electronic device.

17. The system of claim 15, wherein the instructions when executed further cause the system to:

determine, after the rendering of the first band, a refresh interval has passed before the rendering of the second band.

18. The system of claim 15, wherein the instructions when executed further cause the system to:

determine, after the rendering of the second band, additional bands associated with the content are available; and cause, subsequent to the completion of rendering of the second band and while at least a portion of the second band remains displayed on the display screen, a third band of the plurality of bands to be rendered from a third starting location on the display screen.

19. The system of claim 15, wherein the instructions when executed further cause the system to:

receive an input instruction; and determine, based at least in part on the input instruction, an update area of the display screen, the update area corresponding to a location for the content.

20. The system of claim 19, wherein the update area is less than a total screen area.

\* \* \* \* \*